(12) United States Patent
Tzerluk et al.

(10) Patent No.: US 10,114,801 B2
(45) Date of Patent: Oct. 30, 2018

(54) TREEMAP OPTIMIZATION

(71) Applicant: ENTIT SOFTWARE LLC, Sanford, NC (US)

(72) Inventors: Marina Tzerluk, Yehud (IL); Merav Aizenfeld-Green, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/033,183

(22) PCT Filed: Oct. 31, 2013

(86) PCT No.: PCT/US2013/067741
§ 371 (c)(1),
(2) Date: Apr. 29, 2016

(87) PCT Pub. No.: WO2015/068423
PCT Pub. Date: May 7, 2015

(65) Prior Publication Data
US 2016/0253291 A1     Sep. 1, 2016

(51) Int. Cl.
*G06F 17/00* (2006.01)
*G06F 17/21* (2006.01)
*G06F 17/22* (2006.01)
*G06F 17/30* (2006.01)

(52) U.S. Cl.
CPC ........ *G06F 17/212* (2013.01); *G06F 17/2241* (2013.01); *G06F 17/2247* (2013.01); *G06F 17/30327* (2013.01)

(58) Field of Classification Search
None
See application file for complete search history.

(56) References Cited

U.S. PATENT DOCUMENTS

| | | | |
|---|---|---|---|
| 6,583,794 B1* | 6/2003 | Wattenberg | G06F 17/30994 707/999.102 |
| 7,027,052 B1* | 4/2006 | Thorn | G06T 11/206 345/440 |
| 7,076,742 B1* | 7/2006 | Thorn | G06F 17/211 715/851 |
| 7,237,234 B2 | 10/2007 | Leah et al. | |

(Continued)

OTHER PUBLICATIONS

Bruls M., Huizing K., van Wijk J.J., "Squarified Treemaps". total pages: 10, URL <https://www.win.tue.nl/~vanwijk/stm.pdf (Year: 2000).*

(Continued)

*Primary Examiner* — Mustafa A Amin

(57) ABSTRACT

The present disclosure is generally related to a method for treemap optimization. The method includes accessing a plurality of data files stored in memory. The method includes assigning a size value to each of the plurality of data files, wherein each size value is determined based on a characteristic of the corresponding data file. The method includes, in ascending order of size value, merging each of the plurality of data files into an "other" file until a threshold is reached. The method includes displaying the plurality of data files as a plurality of boxes on a treemap on a display screen, wherein the size of each box correlates to the size value of a corresponding data file, and the "other" file is presented as an "other" box.

20 Claims, 4 Drawing Sheets

(56) References Cited

U.S. PATENT DOCUMENTS

| | | | |
|---|---|---|---|
| 7,870,509 B2 | 1/2011 | Ca et al. | |
| 8,015,056 B1* | 9/2011 | Fenstermaker | G06Q 10/06393 |
| | | | 705/7.39 |
| 8,527,936 B2 | 9/2013 | Jain et al. | |
| 8,640,056 B2* | 1/2014 | Helfman | G06F 17/30572 |
| | | | 715/854 |
| 8,854,371 B2* | 10/2014 | Armitage | G06T 11/206 |
| | | | 345/440 |
| 8,866,815 B2* | 10/2014 | Helfman | G06T 11/206 |
| | | | 345/440 |
| 8,910,084 B2* | 12/2014 | Helfman | G06T 11/206 |
| | | | 715/854 |
| 9,396,241 B2* | 7/2016 | Helfman | G06F 3/0482 |
| 9,477,732 B2* | 10/2016 | Helfman | G06F 17/30572 |
| 2004/0168115 A1* | 8/2004 | Bauernschmidt | G06F 17/2241 |
| | | | 715/238 |
| 2004/0263513 A1* | 12/2004 | Smith | G06T 11/206 |
| | | | 345/440 |
| 2010/0042644 A1* | 2/2010 | Judy | G06F 9/4443 |
| | | | 707/797 |
| 2010/0169853 A1* | 7/2010 | Jain | G06F 17/5022 |
| | | | 716/104 |
| 2010/0198796 A1* | 8/2010 | Beresniewicz | G06F 17/30961 |
| | | | 707/688 |
| 2010/0250340 A1* | 9/2010 | Lee | G06Q 10/06 |
| | | | 705/310 |
| 2010/0302279 A1 | 12/2010 | Sud et al. | |
| 2011/0134128 A1 | 6/2011 | Hu et al. | |
| 2011/0292050 A1 | 12/2011 | Gotz | |
| 2012/0311496 A1 | 12/2012 | Cao et al. | |
| 2012/0317518 A1* | 12/2012 | Wittig | G06T 11/206 |
| | | | 715/853 |
| 2015/0186529 A1* | 7/2015 | Rope | G06Q 10/00 |
| | | | 707/722 |
| 2016/0253291 A1* | 9/2016 | Tzerluk | G06F 17/2247 |
| | | | 715/234 |

OTHER PUBLICATIONS

Hart et al, "Drill mode in a visualization in Power B1", May 26, 2018, pp. 1-16, URL<https://docs.microsoft.com/en-us/power-bi/power-bi-visualization-drill-down> (Year: 2018).*

"Treemap | FusionCharts", pp. 1-27, date retrieved: Jul. 17, 2018, URL<https://www.fusioncharts.com/dev/chart-guide/standard-charts/treemap> (Year: 2018).*

Gouthami et al., "Extending the Utility of Treemaps with Flexible Hierarchy", date: 2004, pp. 1-10, URL <https://www.cs.umd.edu/hcil/treemap/FLEXIBLE-HIERARCHY-FINAL.pdf> (Year: 2004).*

Fredrikson et al, "Temporal, Geographical and Categorical Aggregations Viewed through Coordinated Displays: A Case Study with Highway Incident Data", pp. 1-15, dated: 2003, URL <https://www.sciencedirect.com/science/article/pii/B9781558609150500068> (Year: 2003).*

Broeksema, Bertjan et al., "Visual Analysis of Multidimensional Categorical Datasets," Eurographic Conference on Visualization 2012, vol. 31, No. 3, pp, 1-10, 2012 (http://www.cs.rug.nl/alext/PAPERS/CGF13/paper.pdf).

International Searching Authority, The International Search Report and the Written Opinion, dated May 27, 2015, 10 Pages.

Panopticon Software, Treemap Visualizations for Analyzing Multidimensional, Hierarchical Data Sets, White Paper, Mar. 22, 2011, 9 pages http://panopticon com/images/stories/white papers/wp treemap data visualizations for r.

* cited by examiner

400

TREEMAP OPTIMIZATION

BACKGROUND

A treemap is an information visualization technique used for analyzing structured data. The treemap can visualize hierarchical data as a collection of nested boxes to be displayed on a two-dimensional screen, with each box representing a data file or collection of data files. The size, color, and position of each rectangle can be used to represent characteristics of each data file. The treemap allows the data files to be displayed in a well-organized and visually pleasing manner.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

The present disclosure is generally related to optimizing a treemap. More specifically, the presentation of the boxes on the treemap can be optimized to improve the aesthetic, and make data files associated with the boxes appear more accessible. When mapping data files to a treemap, each data file may be assigned a size value corresponding to a particular characteristic of the data file, such as importance, file size, and number of sub-files contained within. It may be difficult to display information clearly if there are too many boxes within a subset of boxes, or if some of the boxes are too small. The examples presented herein provide methods for optimizing layout of the boxes such that the overall presentation is clearer.

In examples discussed herein, an "other" box can be created to encompass all of the boxes that are too small to be displayed clearly on a screen space. The "other" box may also be referred to as a miscellaneous box, a catchall box, a "more" box, or any other name. The size of the "other" box can be optimized such that it is large enough to encompass all of the boxes that are too small to be displayed clearly, but not so large as to take up too much estate on the screen space. In some examples herein, the range of box sizes for a screen space can be reduced such that the smallest boxes appear larger while still maintaining their size relations to larger boxes.

A data file, as used herein, refers to an element of a hierarchical data structure that can be grouped with similar elements. Examples of data files may include, but are not limited to, documents, web pages, applications, tasks, and network nodes.

A screen space, as used herein, refers to estate on a display screen where boxes are displayed. The screen space may refer to the entirety of the available space on the display screen, or it may refer to a subsection of the display screen where a subset of boxes is displayed. A box, as discussed herein, is a two-dimensional object on the treemap that is used to represent a data file. The box may be rectangular, circular, or any other geometric shape.

Figure 1:
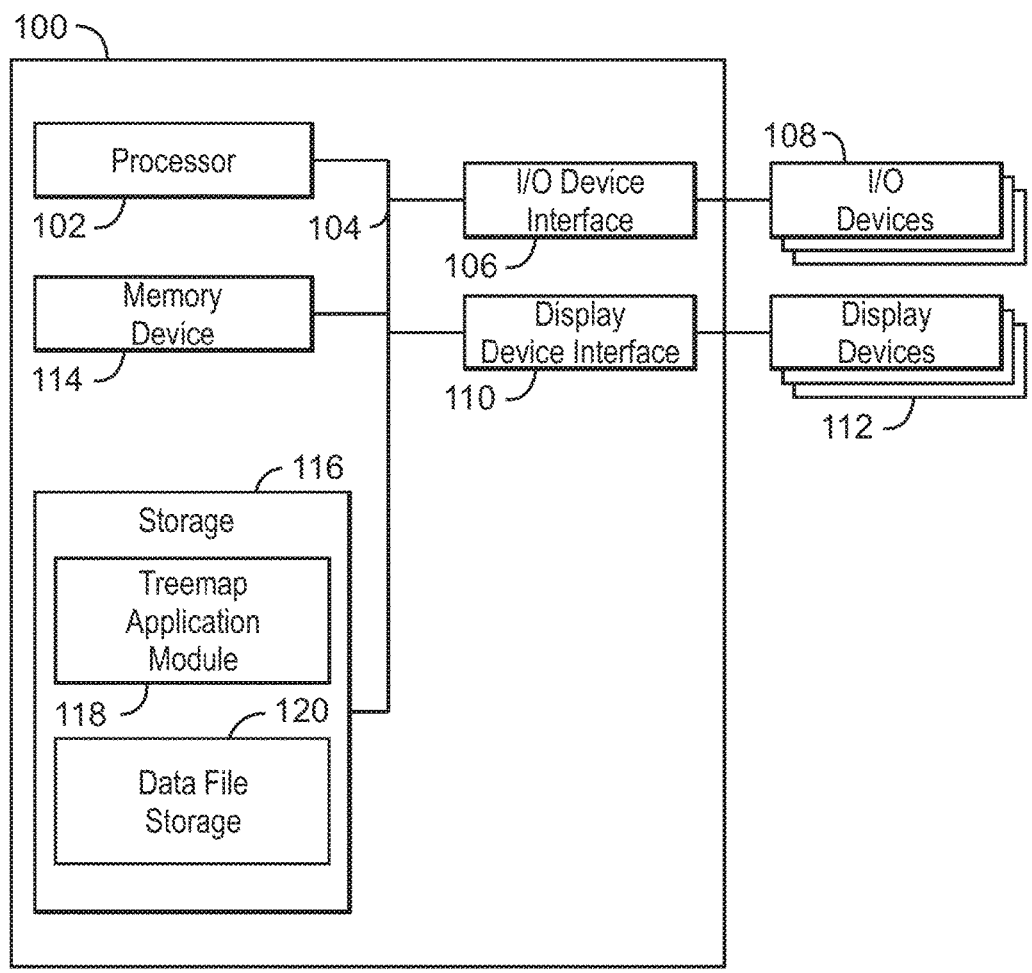
FIG. 1 is a block diagram of a computing system for optimizing a treemap, in accordance with examples of the present disclosure.

FIG. 1 is a block diagram of a computing system for optimizing a treemap, in accordance with examples of the present disclosure. The computing system 100 may include, for example, a server computer, a mobile phone, laptop computer, desktop computer, or tablet computer, among others. The computing system 100 may include a processor 102 that is adapted to execute stored instructions. The processor 102 can be a single core processor, a multi-core processor, a computing duster, or any number of other appropriate configurations.

The processor 102 may be connected through a system bus 104 (e.g., AMBA®, PCI®, PCI Express®, Hyper Transport®, Serial ATA, among others) to an input/output (I/O) device interface 106 adapted to connect the computing system 100 to one or more I/O devices 108. The I/O devices 108 may include, for example, a keyboard and a pointing device, wherein the pointing device may include a touchpad or a touchscreen, among others. The I/O devices 108 may be built-in components of the computing system 100, or may be devices that are externally connected to the computing system 100.

The processor 102 may also be linked through the system bus 104 to a display device interface 110 adapted to connect the computing system 100 to display devices 112. The display devices 112 may include a display screen that is a built-in component of the computing system 100. The display devices 112 may also include computer monitors, televisions, or projectors, among others, that are externally connected to the computing system 100.

The processor 102 may also be linked through the system bus 104 to a memory device 114. In some examples, the memory device 114 can include random access memory (e.g., SRAM, DRAM, eDRAM, EDO RAM, DDR RAM, RRAM®, PRAM, among others), read only memory (e.g., Mask ROM, EPROM, EEPROM, among others), non-volatile memory (PCM, STT_MRAM, ReRAM, Memristor), or any other suitable memory systems.

The processor 102 may also be linked through the system bus 104 to a storage device 116. The storage device 116 can include a treemap application module 118. In some examples, the storage device 116 can include a data file storage 120, which can store a plurality of data files. The treemap application module 118 may contain instructions to enable a processor 102 to access the plurality of data files in the data file storage 120, and cause a display of the data files 110 on a treemap. The processor 102 can cause a display in a number of fashions. For example, causing a display can include communicating instructions to be directly acted on by an operating system or driver responsible for controlling a display screen 112. In another example, causing a display can include communicating data across a network to be processed by another device to display the grid. The processor 102 can analyze characteristics of the data files, and generate treemap boxes based on the analyzed characteristics of each data file 110. For example, the size of each box may be related to the importance of each corresponding data file, or how much memory the data file takes up. The color and on-screen position of each box may also be determined based on each data file's characteristics.

In some examples, the treemap application module can enable the processor 102 to optimize the sizes of the boxes to improve the appearance of the treemap. In some examples, the processor 102 can optimize the boxes in response to a user request made via an I/O device 108. In some examples, the processor 102 can detect that one or more boxes on the treemap fall below a threshold for percentage of screen space taken up. The processor 102 can scale the sizes of each box to reduce the range of sizes, such that the smallest boxes appear larger on screen but still maintain their size relations to the other boxes in the screen space. In other words, the smallest boxes will still appear to be smaller than the largest boxes. In one example, the processor 102 can take the square root of each box size, resulting in smaller boxes taking up a larger percentage of the total size.

In some examples, the treemap application module can enable the processor 102 to create an "other" box that includes a plurality of boxes. In ascending order of box size, the processor 102 can merge the smallest box into the "other" box until a threshold has been reached. In some examples, the threshold can be the size of the "other" box relative to the screen space. If the size of the "other" box exceeds the threshold, then the processor 102 ceases merging. In some examples, the threshold can be the size of the smallest box available (or the next box to be merged) relative to the screen space. If the size of the smallest available box exceeds the threshold, then the processor 102 ceases merging. The "other" box can provide a user with access to the data files of the smaller boxes encompassed within. For example, a user can click or mouse over on the "other" box, and be presented with a list or a drop-down menu containing information or links regarding the data files.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional memory devices, video cards, additional network interfaces, etc.). Furthermore, any of the functionalities of the treemap application module 118 may be partially, or entirely, implemented in any suitable hardware component such as the processor 102. For example, the functionality may be implemented with an application specific integrated circuit, in logic implemented in the processor 102, in a memory device 114, in a video card, or in a co-processor on a peripheral device, among others.

Figure 2A:
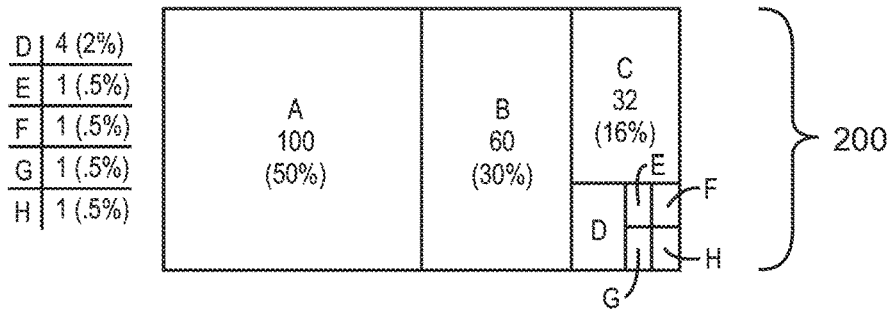
FIGS. 2A, 2B, and 2C are illustrations of an example of a process for optimizing a treemap.
Figure 2B:
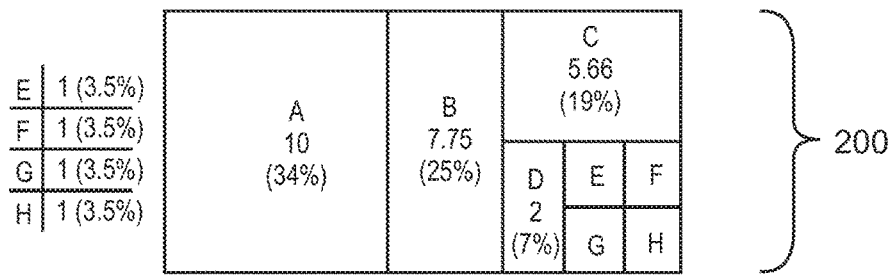
Figure 2C:
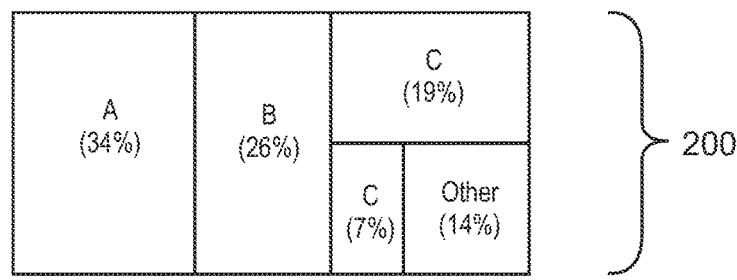

FIGS. 2A, 2B, and 2C are illustrations of an example of a process for optimizing a treemap. A set of data files are represented as a set of boxes of varying size on the screen space 200. The screen space 200 may be the entirety of the treemap, or may be located within a section of the treemap reserved for a particular category or subset of data files.

In FIG. 2A, the set of boxes visually representing the data files are rendered onto the screen space 200. Boxes A, B, C, D, E, F, G, and H are displayed in the screen space 200, with each box assigned a size value based on a characteristic of a corresponding data file. In the example shown in FIG. 2A, the total size value of the screen space 200 is 200 units. As used herein, a unit is an arbitrary unit of measure that is intended to enable a relative comparison of box sizes. As can be seen in the figure, boxes D, E, F, G, and H are substantially smaller than boxes A, B, and C. Due to the small sizes of boxes D, E, F, G, and H, it may be difficult to display information in those boxes.

In FIG. 2B, the sizes of the boxes have been rescaled to reduce the range of sizes. In the example shown in the figure, the rescaled size value of each box is taken as the square root of the previous size value. The actual on-screen size of each box can be determined by the ratio of each box's rescaled size value to the total rescaled size value of the screen space 200. In the example shown in FIG. 2B, the total size value of the screen space 200 is 29.41. The result is that the smaller boxes C, D, E, F, G, and H have increased in size relative to the larger boxes and in proportion to the screen space 200.

In FIG. 2C, the smaller boxes have been merged into an "other" box. Boxes E, F, G, and H have been consolidated into the larger "other" box. The "other" box may be created by iteratively merging each box, in ascending order of box size, into the "other" box until a threshold has been reached. In the example shown in FIG. 2C, two thresholds were considered: the size of the "other" box in proportion to the total size of the screen space 200, and the size of the next smallest box in proportion to the total size of the screen space 200.

Figure 3:
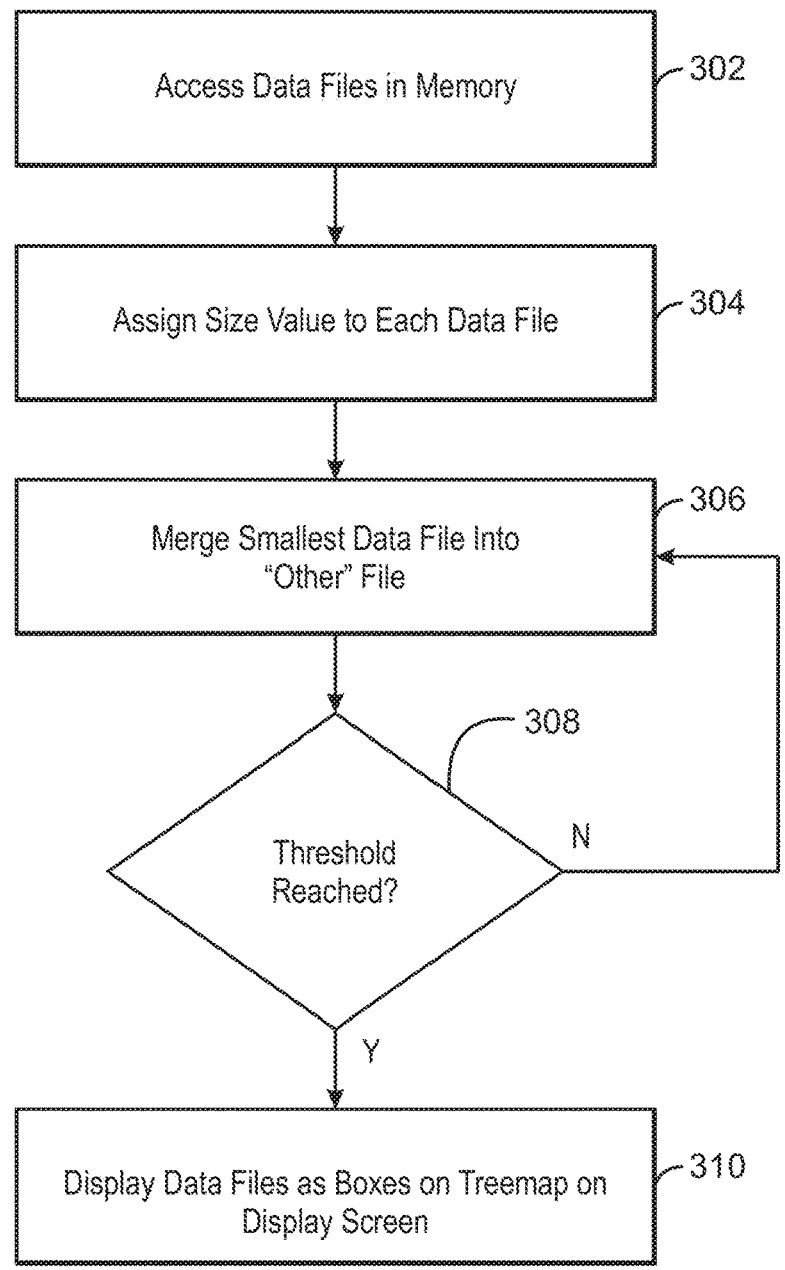
FIG. 3 is a process flow diagram of a method for optimizing a treemap, in accordance with examples of the present disclosure.

FIG. 3 is a process flow diagram of a method for optimizing a treemap, in accordance with examples of the present disclosure. The method 300 may be performed by a processor 102 of a computer system 100 as shown in FIG. 1.

At block 302, a plurality of data files in storage is accessed. The data files may be contained in a hierarchical structure. The processor can analyze a number of characteristics of the data files, such as importance, file size, and number of sub-files contained within.

At block 304, a size value is assigned to each of the plurality of data files. The plurality of boxes is to be displayed inside a screen space. Each size value can be determined based upon an analyzed characteristic of a corresponding data file. In some examples, the size values can be scaled such that the range of sizes is reduced. In some examples, scaling the size values includes taking the square root of each size value.

At block 306, the data file with the smallest size value is merged into an "other" file. The "other" file is a virtual data file that consolidates data files that are considered too small to display clearly. The "other" file may be initialized with a size value of 0, and can increase in size for each data file merged. Multiple iterations of merging may occur. For each iteration, the data file with the smallest size value is merged into the "other" box unless a threshold has been reached.

At block 308, a determination is made for whether or not a threshold has been reached. In some examples, the threshold may be the size value of the "other" file in proportion to the total size value of all of the data files. In some examples, the threshold may be the size value of the smallest available data file in proportion to the total size value of all of the data files. In some embodiments, more than one threshold may be checked. If no threshold has been reached, the process flow returns to block 306 and another iteration of the process is performed. Otherwise, the process flow proceeds to block 310.

At block 310, the plurality of data files is displayed as a plurality of boxes on a treemap on a display screen. The size of each box may correlate with the size value of a corresponding data file. In some examples, the actual on-screen size of each box can be determined by the ratio of each data file's size value to the total size value of all of the data files. The color and position of each box on the treemap may also reflect other characteristics regarding the corresponding data file. The "other" file may be represented as an "other" box on the treemap. In some examples, the "other" box may display information, or function as a link to information, related to the data files incorporated within.

Figure 4:
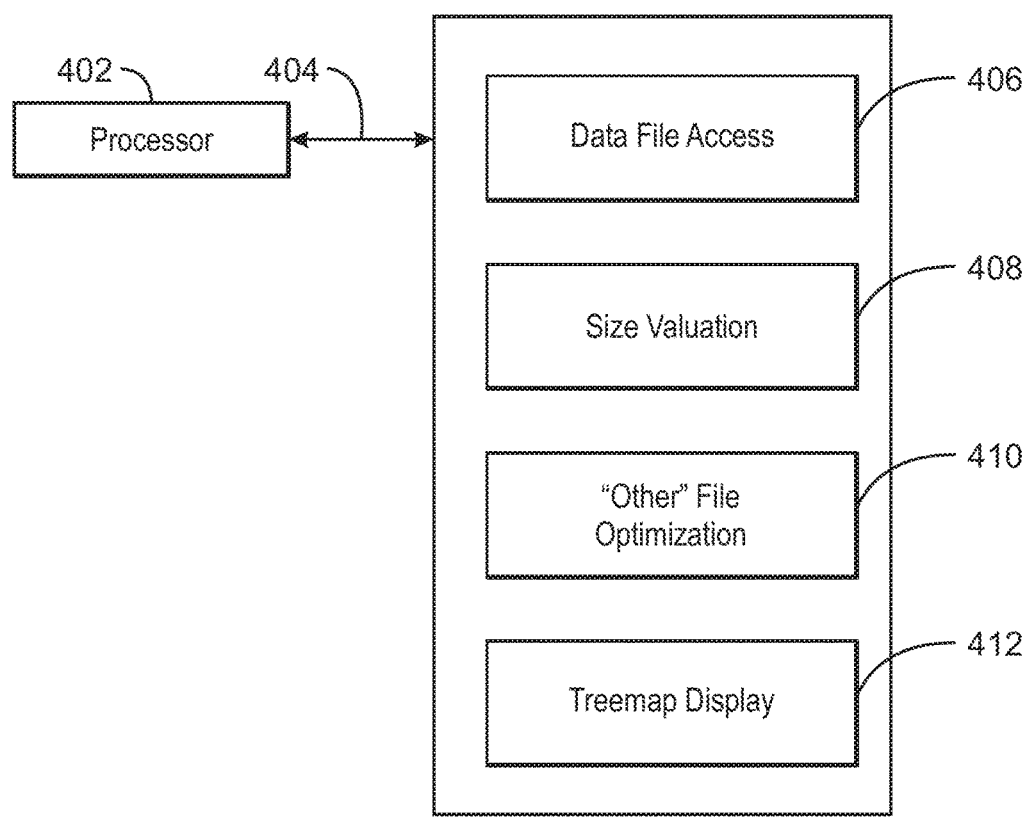
FIG. 4 is a block diagram of a tangible, non-transitory computer-readable medium, containing instructions for optimizing a treemap.

FIG. 4 is a block diagram of a tangible, non-transitory computer-readable medium, containing instructions for optimizing a treemap. The non-transitory, computer-readable medium 400 can include RAM, a hard disk drive, an array of hard disk drives, an optical drive, an array of optical drives, a non-volatile memory, a universal serial bus (USB) drive, a digital versatile disk (DVD), or a compact disk (CD), among others. The tangible, non-transitory computer-readable media 400 may be accessed by a processor 402 over a computer bus 404. Furthermore, the tangible, non-transitory computer-readable medium 400 may include instructions configured to direct the processor 402 to perform the techniques described herein.

As shown in FIG. 4, the various components discussed herein can be stored on the non-transitory, computer-readable medium 400. A data file access module 406 may be configured to access a plurality of data files in storage. A size valuation module 408 may be configured to assign a size value to each of the plurality of data files. An "other" file optimization module 410 may be configured to iteratively merge data files, in ascending order of size value, into an "other" file until a threshold is reached. A treemap display module 412 may be configured to display the plurality of data files as a plurality of boxes on a treemap on a display screen.

The block diagram of FIG. 4 is not intended to indicate that the tangible, non-transitory computer-readable medium 400 are to include all of the components shown in FIG. 4. Further, the tangible, non-transitory computer-readable medium 400 may include any number of additional components not shown in FIG. 4, depending on the details of the specific implementation.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A method executed by a system comprising a processor, comprising:
   accessing a plurality of data files in storage;
   assigning a size value to each of the plurality of data files, wherein each size value is determined based on a size of a corresponding data file of the plurality of data files;
   in ascending order of size value of the size values assigned to the plurality of data files, iteratively merging each of data files of a first subset of the plurality of data files into a merge file until a threshold is reached, the plurality of data files comprising a second subset of data files in addition to the first subset of data files;
   displaying the second subset of data files as a plurality of boxes on a treemap on a display screen, wherein the size of each box of the plurality of boxes correlates to the size value of a corresponding data file of the second subset of data files, and displaying the merge file as a merge box on the treemap on the display screen; and
   in response to user selection of the merge box in the treemap, presenting information of each individual data file of the first subset of data files merged into the merge file, the presented information enabling user access to the first subset of data files.

2. The method of claim 1, comprising downscaling a range of the size values.

3. The method of claim 2, wherein downscaling the range of the size values comprises taking a square root of each size value of the size values.

4. The method of claim 1, wherein the threshold is based on a size value of the merge file.

5. The method of claim 1, wherein the threshold is based on a size value of the smallest data file in the plurality of data files, excluding the merge file.

6. The method of claim 1, further comprising:
   initializing, by the system, a size value of the merge file to an initial value prior to merging data files into the merge file; and
   iteratively increasing, by the system, the size value of the merge file as each data file of the first subset of data files is merged into the merge file.

7. The method of claim 4, further comprising setting the threshold as a proportion of the size value of the merge file relative to a total size of the plurality of data files.

8. The method of claim 1, wherein presenting information of each individual data file of the first subset of data files merged into the merge file comprises presenting a listing of the individual data files of the first subset of data files.

9. A system, comprising:
   a processor; and
   a non-transitory storage medium storing instructions executable on the processor to:
      access a plurality of data files in storage;
      assign a size value to each of the plurality of data files, wherein each size value is determined based on a size of a corresponding data file of the plurality of data files; and
      in ascending order of size value of the size values assigned to the plurality of data files, iteratively merge each of data files of a first subset of the plurality of data files into a merge file until a threshold is reached, the plurality of data files comprising a second subset of data files in addition to the first subset of data files;
      cause a display of the second subset of data files as a plurality of boxes on a treemap, wherein the size of each box of the plurality of boxes correlates to the size value of a corresponding data file of the second subset of data files, and cause display of the merge file as a merge box in the treemap;
      in response to user selection of the merge box in the treemap, present information of each individual data file of the first subset of data files merged into the merge file; and
      provide user access to a data file of the first subset of data files based on user selection of the presented information of each individual data file of the first subset of data files.

10. The system of claim 9, wherein the instructions are executable on the processor to downscale a range of the size values by computing a square root of each size value of the size values.

11. The system of claim 9, wherein the threshold is based on a size value of the merge file in proportion to a total size of the plurality of data files.

12. The system of claim 9, wherein the instructions are executable on the processor to:
   compute the size of each respective box of the plurality of boxes in the treemap based on a ratio of the size of the corresponding data file to a total size of the plurality of data files.

13. The system of claim 9, wherein the instructions are executable on the processor to:
   initialize a size value of the merge file to an initial value prior to merging data files into the merge file; and iteratively increase the size value of the merge file as each data file of the first subset of data files is merged into the merge file.

14. The system of claim 9, wherein the presenting of the information of each individual data file of the first subset of data files merged into the merge file comprises presenting a menu listing of the individual data files of the first subset of data files.

15. A non-transitory computer-readable medium comprising instructions that upon execution cause a system to:
access a plurality of data files in storage;
assign a size value to each of the plurality of data files, wherein each size value is determined based on a size of a corresponding data file of the plurality of data files;
in ascending order of size value of the size values assigned to the plurality of data files, iteratively merge each of data files of a first subset of the plurality of data files into a merge file until a threshold is reached, the plurality of data files comprising a second subset of data files in addition to the first subset of data files;
cause display of the second subset of data files as a plurality of boxes on a treemap on a display screen, wherein the size of each box of the plurality of boxes correlates to the size value of a corresponding data file of the second subset of data files, and cause display of the merge file as a merge box on the treemap on the display screen; and
in response to user selection of the merge box in the treemap, presenting information of each individual data file of the first subset of data files merged into the merge file, the presented information enabling user access to the first subset of data files.

16. The non-transitory computer-readable medium of claim 15, wherein the instructions upon execution cause the system to downscale a range of the size values.

17. The non-transitory computer-readable medium of claim 15, wherein the instructions upon execution cause the system to compute the threshold as a proportion of a size value of the merge file relative to a total size of the plurality of data files.

18. The non-transitory computer-readable medium of claim 15, wherein the instructions upon execution cause the system to:
initialize a size value of the merge file to an initial value prior to merging data files into the merge file; and
iteratively increase the size value of the merge file as each data file of the first subset of data files is merged into the merge file.

19. The non-transitory computer-readable medium of claim 15, wherein the presenting of the information of each individual data file of the first subset of data files merged into the merge file comprises presenting a menu listing of the individual data files of the first subset of data files.

20. The non-transitory computer-readable medium of claim 15, wherein the instructions upon execution cause the system to:
compute the size of each respective box of the plurality of boxes in the treemap based on a ratio of the size of the corresponding data file to a total size of the plurality of data files.

* * * * *